United States Patent
Reyes

(10) Patent No.: US 10,512,326 B2
(45) Date of Patent: Dec. 24, 2019

(54) STACKABLE STORAGE RACK

(71) Applicant: Bechtel Oil, Gas, and Chemicals, Inc., Houston, TX (US)

(72) Inventor: Jorge Reyes, Richmond, TX (US)

(73) Assignee: Bechtel Oil, Gas, and Chemicals, Inc., Houston, TX (US)

( * ) Notice: Subject to any disclaimer, the term of this patent is extended or adjusted under 35 U.S.C. 154(b) by 0 days.

(21) Appl. No.: 15/455,218

(22) Filed: Mar. 10, 2017

(65) Prior Publication Data
US 2018/0125231 A1 May 10, 2018

Related U.S. Application Data

(63) Continuation of application No. 15/510,088, filed as application No. PCT/US2016/061315 on Nov. 10, 2016.

(51) Int. Cl.
| A47B 47/00 | (2006.01) |
| A47B 47/02 | (2006.01) |
| A47B 81/00 | (2006.01) |

(52) U.S. Cl.
CPC .......... *A47B 47/0091* (2013.01); *A47B 47/02* (2013.01); *A47B 81/005* (2013.01)

(58) Field of Classification Search
CPC ........ B65D 19/385; B65D 2519/00233; B65D 2519/00955; B65D 2519/0096; B65D 2519/00965; B65D 2519/0097; B65D 2519/00975; B65D 19/38; B65D 19/00; A47B 87/0215; A47B 87/0246; A47B 81/005; A47B 47/0008; A47B 47/0091; A47B 47/021; A47B 47/02; B65G 1/02; B65G 1/14

USPC ........ 211/188, 194; 108/51.1, 51.3, 51.5, 91
See application file for complete search history.

(56) References Cited

U.S. PATENT DOCUMENTS

| 2,543,274 A | * | 2/1951 | Bender | ................... E21B 19/15 206/443 |
| 2,654,487 A | * | 10/1953 | Degener | ............ A47B 87/0215 108/157.13 |
| 2,791,325 A | * | 5/1957 | Schecter | ................ B65D 19/00 108/53.5 |
| 2,801,752 A | * | 8/1957 | Jakubowski | .......... A47B 81/005 211/188 |

(Continued)

OTHER PUBLICATIONS

Blaine R. Copenheaver, International Search Report and Written Opinion of the International Searching Authority, PCT Application No. PCT/US2016/061315, dated Feb. 27, 2017, 11 pages, International Searching Authority.

(Continued)

*Primary Examiner* — Patrick D Hawn
(74) *Attorney, Agent, or Firm* — Crain, Caton and James

(57) ABSTRACT

A stackable storage rack, which includes a base with multiple sockets for connecting a respective pair of vertical support members in a manner that permits multiple storage racks to be stacked on-site with their respective vertical support members attached and in a standard shipping container without their respective vertical support members attached. The storage rack also maximizes the storage capacity in a standard shipping container when it is loaded in a standard shipping container with its vertical support members attached.

10 Claims, 4 Drawing Sheets

(56) References Cited

U.S. PATENT DOCUMENTS

| | | | | |
|---|---|---|---|---|
| 3,233,564 | A * | 2/1966 | Sullivan | B65D 19/0016 108/53.1 |
| 3,459,326 | A * | 8/1969 | Betjemann | B65D 88/005 206/512 |
| 3,502,227 | A * | 3/1970 | Schell, Jr. | A47B 81/007 211/194 |
| 3,533,502 | A * | 10/1970 | Hansen | A47B 45/00 206/386 |
| 3,641,949 | A * | 2/1972 | Monk | B65D 19/0018 108/53.3 |
| 3,702,100 | A * | 11/1972 | Wharton | B65D 19/0012 108/53.3 |
| 3,788,242 | A * | 1/1974 | Hassel | A47B 47/024 108/107 |
| 3,848,747 | A * | 11/1974 | Thompson | A47B 87/0215 108/53.5 |
| 3,857,494 | A * | 12/1974 | Giardini | A47B 47/05 108/53.5 |
| 4,703,702 | A * | 11/1987 | Speicher | B65D 19/385 108/52.1 |
| 4,706,824 | A * | 11/1987 | Mercer | A47F 5/118 108/186 |
| 4,714,169 | A * | 12/1987 | Keenan | B65D 19/06 220/1.5 |
| 4,773,547 | A * | 9/1988 | Bell | A47B 87/0215 108/53.1 |
| 4,862,602 | A * | 9/1989 | Krill | F26B 25/18 211/182 |
| 4,986,705 | A | 1/1991 | Durkin | |
| 5,411,153 | A | 2/1995 | Unfried | |
| 5,606,921 | A * | 3/1997 | Elder | B65D 19/0018 108/53.1 |
| 5,671,854 | A * | 9/1997 | Thomas | B65D 88/12 220/1.5 |
| 6,029,583 | A * | 2/2000 | LeTrudet | B65D 19/0012 108/57.25 |
| 6,279,763 | B1 * | 8/2001 | Bush | A47B 43/00 108/55.1 |
| 6,520,356 | B2 * | 2/2003 | Miller, Jr. | A47F 5/10 108/106 |
| 6,726,041 | B2 * | 4/2004 | Dunn | B65D 19/12 206/335 |
| 6,814,529 | B2 * | 11/2004 | Junge | B65D 19/44 206/335 |
| 7,097,054 | B2 * | 8/2006 | Beck | B65D 19/12 206/335 |
| 7,131,803 | B2 * | 11/2006 | Guarisco, Sr. | B60P 7/12 410/100 |
| 7,152,749 | B2 * | 12/2006 | Beck | B65D 19/12 206/335 |
| 7,762,416 | B2 * | 7/2010 | Arnold | B65D 19/18 220/1.5 |
| 7,802,526 | B2 * | 9/2010 | Brady et al. | B65D 19/12 108/53.5 |
| 7,922,011 | B2 | 4/2011 | Knight et al. | |
| 8,002,128 | B2 * | 8/2011 | Kern | B65D 19/12 211/194 |
| 8,291,839 | B2 * | 10/2012 | Apps | B65D 19/004 108/53.3 |
| 8,327,775 | B2 * | 12/2012 | Fox Harris | B65D 19/385 108/53.3 |
| 8,381,910 | B2 * | 2/2013 | Cadoret | A47J 27/20 206/511 |
| 8,857,634 | B2 * | 10/2014 | Harris | B65D 19/08 108/53.1 |
| 9,340,322 | B2 * | 5/2016 | Harris | B65D 19/385 |
| 9,492,009 | B2 * | 11/2016 | Naka | A47B 47/0091 |
| 9,580,236 | B1 * | 2/2017 | Skeid | B65D 19/08 |
| 2002/0000418 | A1 * | 1/2002 | Miller, Jr. | A47F 5/0018 211/188 |
| 2002/0009345 | A1 | 1/2002 | Clive-Smith | |
| 2002/0030597 | A1 | 3/2002 | Muirhead | |
| 2003/0150757 | A1 * | 8/2003 | Dunn | B65D 19/12 206/335 |
| 2004/0188307 | A1 * | 9/2004 | Beck | B65D 19/12 206/503 |
| 2005/0211139 | A1 * | 9/2005 | Perrotta | B65D 19/0038 108/57.25 |
| 2006/0088405 | A1 | 4/2006 | Leimbach et al. | |
| 2008/0193247 | A1 | 8/2008 | Zupancich et al. | |
| 2014/0027395 | A1 | 1/2014 | Benoit et al. | |
| 2015/0257530 | A1 * | 9/2015 | Naka | A47B 47/0091 211/188 |
| 2015/0351533 | A1 * | 12/2015 | Reinhart | A47B 47/0091 211/188 |

OTHER PUBLICATIONS

"MTT" video uploaded to YouTube on Nov. 14, 2010 (https://www.youtube.com/watch?v=f-uFoxZ_9O1) (screenshots, 12 pages).

Cargo Loading Solution Machinery Co., LTD website, download page (www.clsca.com/download), 2 pages.

Mobile Transport Tray (MU) brochure, Nov. 8, 2010, 4 pages (retrieved from https://docs.google.com/viewer? a=v&pid=sites &srcid=Y2xzY2EuY29ffGVuZ2xpc2h8Z3g6MTg4OTBh0 GlyOGQ4MmMxYQ) (last link on the download page, NPL2 above).

Cargo Loading Solution Machinery Co., MTT Specification, Jun. 18, 2011, 2 pages (retrieved Oct. 9, 2019 from https://web.archive.org/web/20110618071544/http://www.clsca.com/spectitication).

Office Action dated Jul. 25, 2019, U.S. Appl. No. 15/510,088, Mark C. Hageman, Examiner, USPTO, Alexandria Virginia, 8 pages.

* cited by examiner

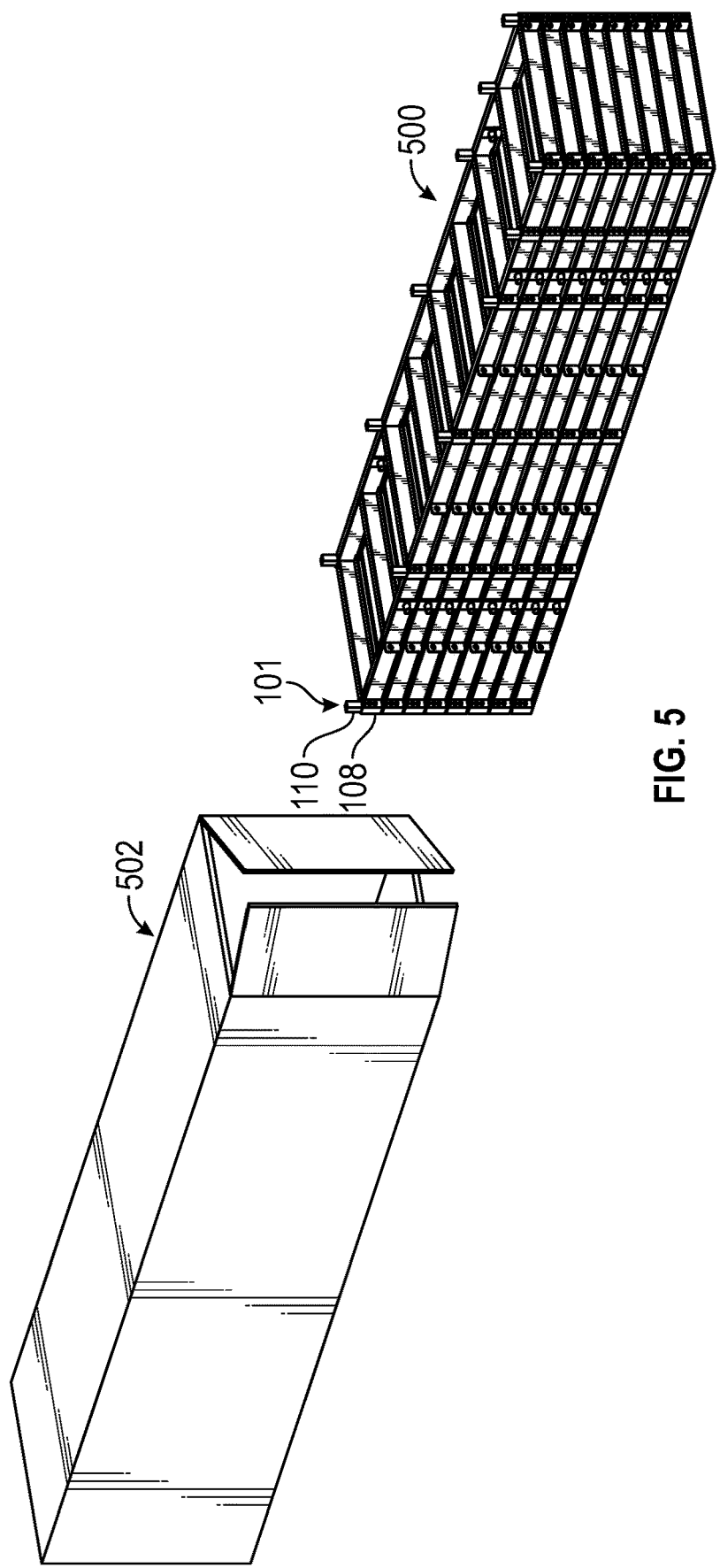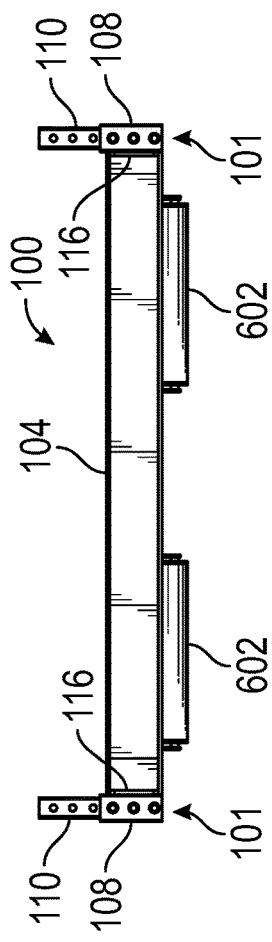
FIG. 5
FIG. 6

STACKABLE STORAGE RACK

This application is a continuation of U.S. patent application Ser. No. 15/510,088, filed on Mar. 9, 2017, which is incorporated herein by reference and claims the priority of PCT Application No. PCT/US16/61315, filed on Nov. 10, 2016, which is incorporated herein by reference.

FIELD OF THE DISCLOSURE

The present disclosure generally relates to a stackable storage rack. More particularly, the present disclosure relates to a stackable storage rack, which includes a base with multiple sockets for connecting a respective pair of vertical support members in a manner that permits multiple storage racks to be stacked on-site with their respective vertical support members attached and in a standard shipping container without their respective vertical support members attached. The storage rack also maximizes the storage capacity in a standard shipping container when it is loaded in a standard shipping container with its vertical support members attached.

BACKGROUND

Pipe spools are often transported on shipping frames, hereinafter referred to as storage racks, in standard sea shipping containers measuring 40 ft. (length)×8 ft. (width)× 9.6 ft. (height). The storage racks may be a standard design or procured through a pipe fabricator to meet certain design specifications. One standard storage rack design uses a flat base and wooden sides as dunnage to secure the pipe spools. However, this design limits storage at the jobsite and transportation over the road. For example, this type of storage rack cannot be stacked fully loaded on-site and empty in a standard shipping container. Moreover, when a piece of wood siding is removed, the integrity of the entire storage rack is compromised and the entire storage rack must be dismantled. As a result, a high square footage of laydown space must be accounted for in order to safely and properly manage the material.

Storage racks specifically designed to meet certain specifications often include a flat base and vertical support members to secure the pipe spools. One common storage rack design uses vertical support members coupled to sockets that are welded to the top of the base. Although the vertical support members may be removed, the sockets remain welded to the top of the base without an opening below the base for receipt of another vertical member or socket. This design thus, limits storage at the jobsite and transportation over the road because this type of storage rack cannot be stacked fully loaded on-site. Moreover, this design also limits the number of storage racks that may be stacked empty in a standard shipping container to about three.

As a result of current storage rack design limitations, only 6-8 metric tons per truckload can be transported due to the fact that they cannot load more than one (1) layer of pipe spools on a flatbed. There is therefore, a need for a transportable storage rack that is prefabricated and permits multiple storage racks to be stacked fully loaded on-site and empty in a standard shipping container.

BRIEF DESCRIPTION OF THE DRAWINGS

The present disclosure is described with reference to the accompanying drawings, in which like elements are referenced with like reference numbers, and in which:

FIG. 5 is an isometric view of the empty storage rack in FIG. 1 illustrating it stacked on additional empty storage racks of the same design next to a standard shipping container.

FIG. 6 is an end view of the empty storage rack in FIG. 1 illustrating end rollers for moving the storage rack empty or loaded.

DETAILED DESCRIPTION OF THE PREFERRED EMBODIMENTS

The present disclosure overcomes one or more of the prior art disadvantages with a stackable storage rack, which includes a base with multiple sockets for connecting a respective pair of vertical support members in a manner that permits multiple storage racks to be stacked on-site with their respective vertical support members attached and in a standard shipping container without their respective vertical support members attached. The storage rack also maximizes the storage capacity in a standard shipping container when it is loaded in a standard shipping container with its vertical support members attached.

In one embodiment, the present disclosure includes a storage rack, comprising: i) a base with a surface for supporting a load stored on the storage rack or for supporting the storage rack on another surface; ii) a plurality of sockets attached to a perimeter of the base, each socket including an open end flush with the surface of the base for detachably connecting a vertical support member and a stub end for detachably connecting another vertical support member; and iii) each stub end sized to fit entirely within an open end of a respective socket on another storage rack such that the surface of the base of the storage rack and a surface of a base of the another storage rack are capable of abutting when stacked together.

The subject matter of the present disclosure is described with specificity, however, the description itself is not intended to limit the scope of the disclosure. The subject matter thus, might also be embodied in other ways, to include different structures, steps and/or combinations similar to and/or fewer than those described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order.

Figure 1:
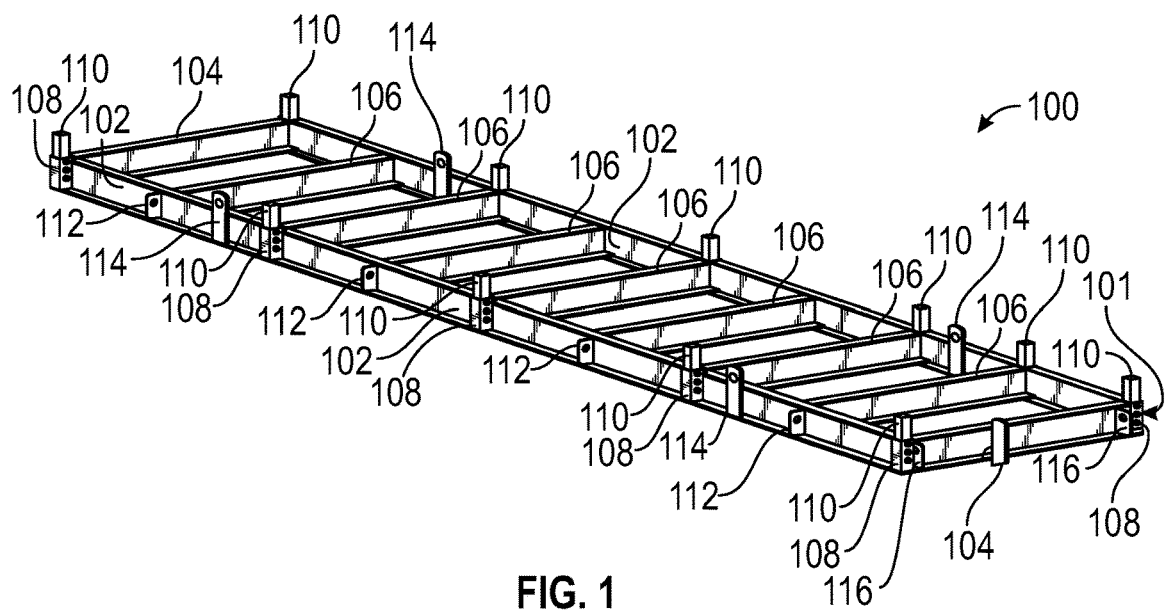
FIG. 1 is an isometric view illustrating one embodiment of a stackable storage rack without vertical support members.

Referring now to FIG. 1, an isometric view illustrates one embodiment of a stackable storage rack without vertical support members. The storage rack includes a base 100 with a plurality of sockets 101 positioned around a perimeter of the base 100. Each socket 101 is preferably welded to the perimeter of the base 100 and includes an open end 108 for detachably connecting a vertical support member and a stub end 110 for detachably connecting another vertical support member. The open end 108 of each socket 101 is substantially flush with a bottom of the base 100 and the stub end 110 of each socket 101 extends above a top of the base 100. Each socket 101 preferably comprises a section of square tubing welded within another section of square tubing however, may comprise different types of tubing or components that serve the same function. In this embodiment, there are ten (10) sockets 101 welded to the perimeter of the base 100. More or less sockets 101 may be used, however, depending on the load on the base 100. The plurality of sockets 101 are equidistantly spaced apart around the perimeter of the base 100 to provide lateral support for the load on the base 100.

The base 100 is preferably a rectangular frame comprising side frame members 102 that are preferably welded to end frame members 104. A plurality of internal support members 106 are preferably welded to the side frame members 102 of the rectangular frame for supporting the load on the base 100. The side frame members 102, end frame members 104 and internal support members 106 are preferably made of structural steel however, may be made of different materials provided they support comparable loads (e.g. various grades of steel (high strength-low alloy, advanced high strength, etc.), aluminum, or other fabricated alloy metals)). The base 100 is preferably at least 38 feet long and at least 7 feet wide. The side frame members 102 include a plurality of tie down extensions 112 for securing the load to the base 100 and a plurality of lifting extensions 114 for lifting the storage rack fully loaded or empty. The side frame members 102 may include additional tie bars as necessary for further securing the load to the base 100.

Figure 2:
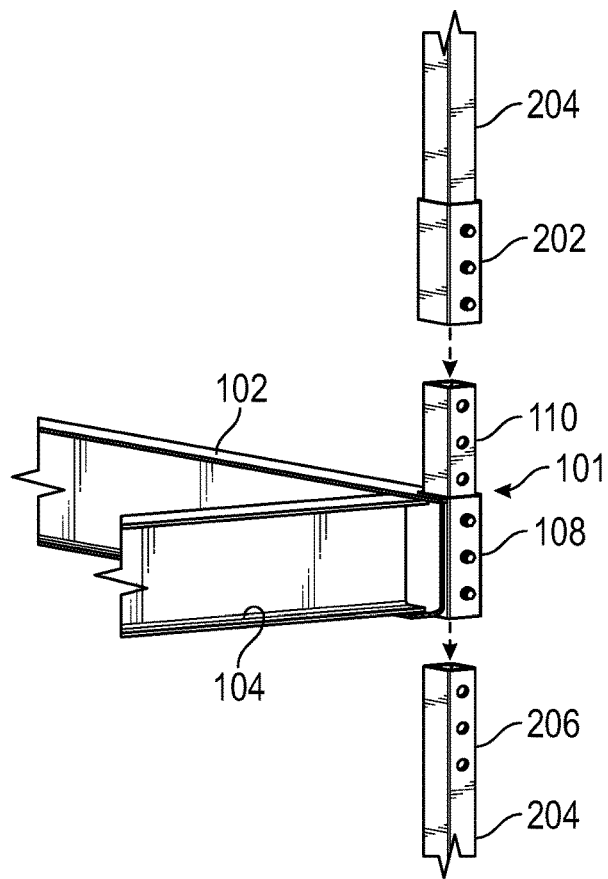
FIG. 2 is an exploded view illustrating the connection of vertical support members to the storage rack in FIG. 1.
Figure 3:
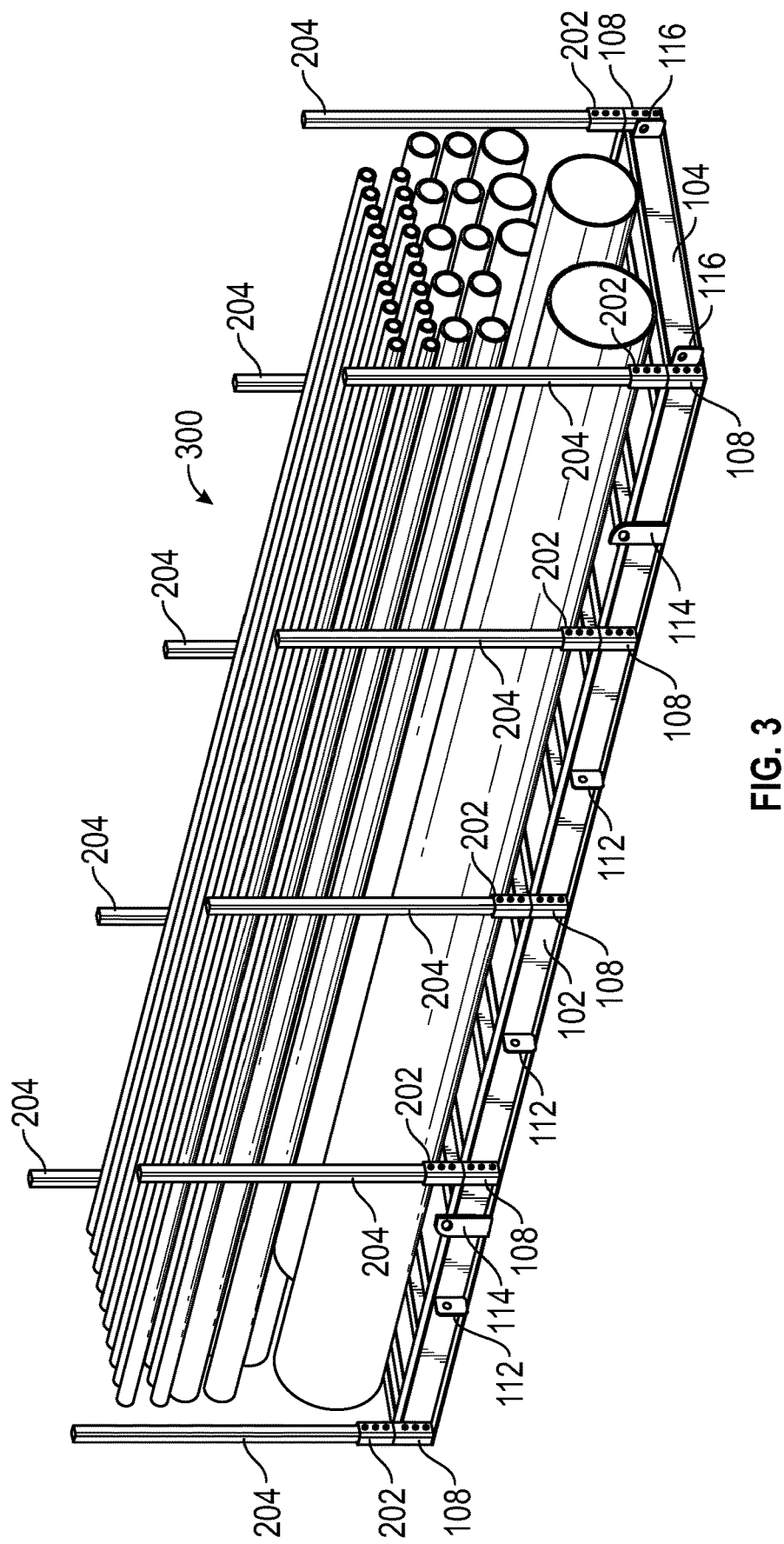
FIG. 3 is an isometric view of the storage rack in FIG. 1 illustrating a load secured between vertical support members coupled to the storage rack.
Figure 4:
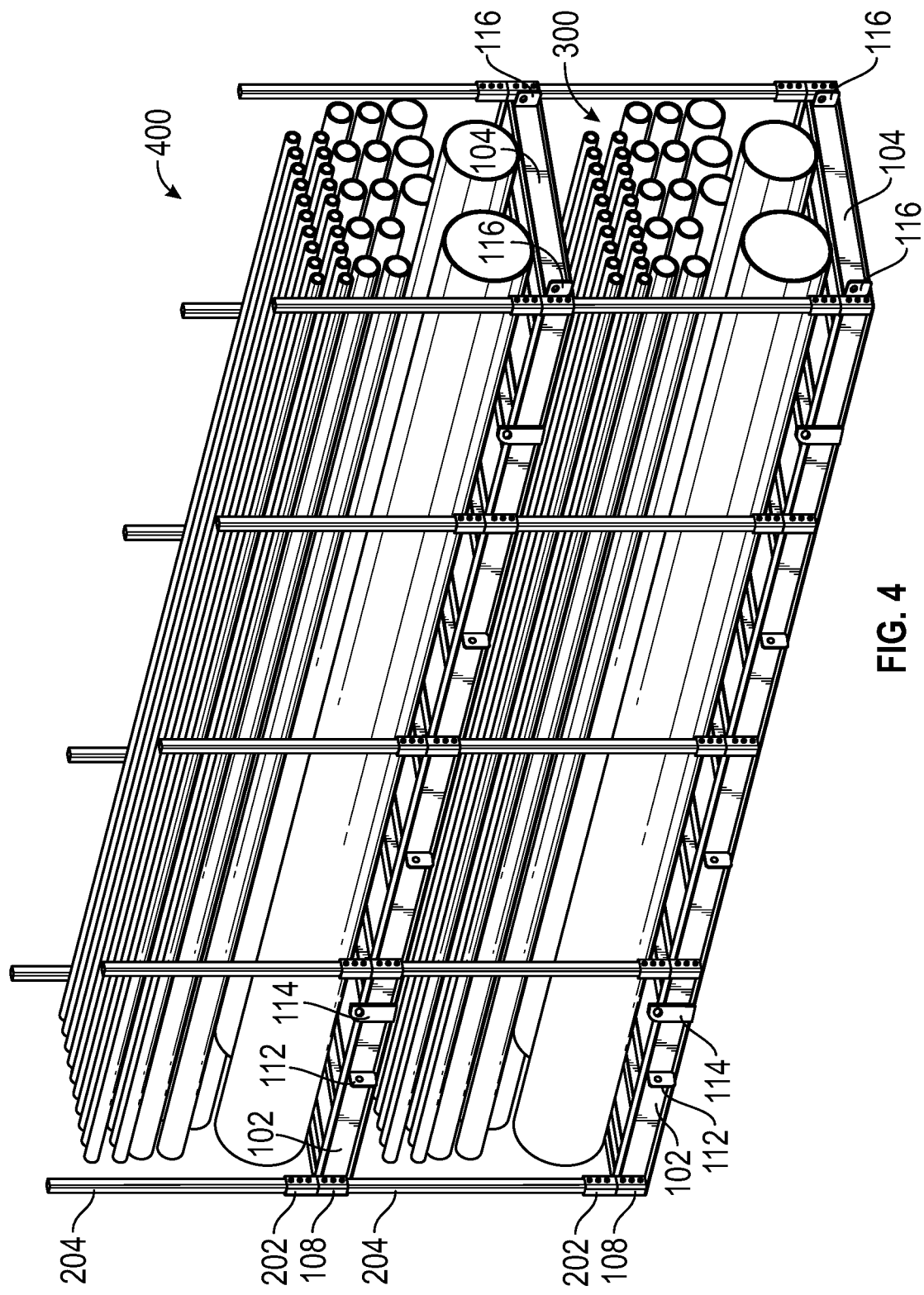
FIG. 4 is an isometric view of the loaded storage rack in FIG. 3 illustrating it stacked on another loaded storage rack of the same design.

Referring now to FIG. 2, an exploded view illustrates the connection of vertical support members to the storage rack in FIG. 1. Each vertical support member 204 includes an open lower end 202 that is detachably connected to the stub end 110 of a respective socket 101 when the storage rack is loaded as illustrated by the load 300 on the storage rack in FIG. 3, which is secured between the vertical support members 204. Each vertical support member 204 also includes an upper end 206 that may be detachably connected to the open end 108 of a respective socket 101 when the storage rack is loaded and stacked on top of another storage rack that is loaded as illustrated by the load 400 on the storage rack stacked on top of another storage rack with the load 300 in FIG. 4.

The open lower end 202 of each vertical member 204 includes a plurality of transverse openings therethrough that align with a plurality of transverse openings through the stub end 110 of the respective socket 101 when the open lower end 202 is detachably connected to the stub end 110. The open lower end 202 may be detachably connected to the stub end 110 by a plurality of bolts passing through a respective one of the plurality of transverse openings through the open lower end 202 and the stub end 110 and secured with a respective nut. The upper end 206 of each vertical member 204 likewise includes a plurality of transverse openings therethrough that align with a plurality of transverse openings through the open end 108 of the respective socket 101 when the upper end 206 is detachably connected to the open end 108. The upper end 206 may be detachably connected to the open end 108 by a plurality of bolts passing through a respective one of the plurality of transverse openings through the upper end 206 and the open end 108 and secured with a respective nut. Other means for detachably connecting the vertical support members to a respective socket 101 may be used, however. Each vertical member 204 preferably comprises a section of square tubing welded within another section of square tubing that forms the open end 202, however, may comprise different types of tubing or components that serve the same function. In an alternative embodiment, each vertical member 204 includes a lower end that is the same as the upper end 206 and each socket includes another open end that is the same as the open end 108 and extends above a top of the base 100. In this embodiment, the lower end of each vertical member 204 may be detachably connected to the another open end of a respective socket 101 by a plurality of bolts and secured with a respective nut. Each vertical member 204 is preferably 8.5 feet in length, however, may be shorter or longer depending on the load and/or safety requirements for the storage rack. As illustrated by the loads 300, 400 in FIG. 4, the load may comprise pipe, pipe spools, structural steel and/or anything else that is capable of being safely secured to the storage rack.

Based on the preferred dimensions of the storage rack base 100 and its vertical members 204, a fully loaded storage rack will maximize the storage capacity of a standard sea shipping container. In this manner, shipping costs are reduced. Although most conventional storage racks have similar dimensions for a base, they do not have the requisite length for the vertical members to maximize the storage capacity of the standard shipping container. A fully loaded conventional storage rack is also incapable of being safely stacked on top of another fully loaded storage rack on-site to conserve storage space. Conversely, the storage rack design disclosed herein can be stacked fully loaded and empty while maintaining stability and safety. This not only are shipping costs reduced but also on-site storage space is reduced.

Referring now to FIG. 5, an isometric view of the empty storage rack in FIG. 1 illustrates it stacked on additional empty storage racks of the same design next to a standard sea shipping container 502. Due to the unique design of the socket 101, up to 8 storage racks 500 can be stacked and loaded into the standard shipping container 502 thus, reducing shipping costs. Conventional storage racks are limited to about 3 being stacked and loaded into a standard shipping container. The unique design of the socket 101 allows the stub end 110 of each socket 101 to be detachably connected to the open end 108 of another socket 101 in the same manner as described herein for connecting the vertical support members 204. In FIG. 6, an end view of the empty storage rack in FIG. 1 illustrates end rollers 602 attached to a bottom of the base 100 for conveniently moving the storage rack relative to a surface empty or fully loaded.

The storage rack design disclosed herein makes transporting the storage rack fully loaded or empty more safe and cost efficient. In addition, a radio frequency identification tag may be attached to each base 100 of a storage rack to conveniently track each storage rack on-site without the need to track individual components of the loaded material. The radio frequency identification tag also enables global tracking and historical use of each storage rack from site to site and project to project.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A storage rack, comprising:
 a base with a surface for supporting a load stored on the storage rack or for supporting the storage rack on another surface;
 a plurality of sockets attached to a perimeter of the base, each socket including an open end flush with the surface of the base for detachably connecting a vertical support member and a stub end for detachably connecting another vertical support member; and
 each stub end sized to fit entirely within an open end of a respective socket on another storage rack such that the surface of the base of the storage rack and a surface of a base of the another storage rack are capable of abutting when stacked together; and wherein each socket comprises a section of square tubing welded within another section of square tubing.

2. The storage rack of claim 1, further comprising a plurality of vertical support members, each vertical support member including an open end detachably connected to the stub end of a respective socket of the storage rack.

3. The storage rack of claim 2, wherein each vertical support member is 8.5 feet in length.

4. The storage rack of claim 1, wherein each base includes ten sockets equidistantly spaced apart around the perimeter of the base.

5. The storage rack of claim 1, wherein each socket is welded to the perimeter of the base.

6. The storage rack of claim 1, further comprising a roller attached to a bottom surface of the base of the storage rack for moving the storage rack relative to a surface.

7. The storage rack of claim 1, further comprising a radio frequency identification tag attached to each base.

8. The storage rack of claim 1, wherein each base includes a rectangular frame and a plurality of internal support members connected to the rectangular frame.

9. The storage rack of claim 8, wherein the rectangular frame and the plurality of internal support members are structural steel.

10. The storage rack of claim 1, wherein the open end of each socket is flush with the surface for supporting a load stored on the storage rack.

\* \* \* \* \*